(12) United States Patent
Singh et al.

(10) Patent No.: US 8,767,619 B1
(45) Date of Patent: Jul. 1, 2014

(54) MINIMIZING ADJACENT CARRIER INTERFERENCE BY VARYING THE POWER LEVEL OF SUBCARRIERS

(75) Inventors: Jasinder P. Singh, Olathe, KS (US); Maulik K. Shah, Overland Park, KS (US); Siddharth S. Oroskar, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 396 days.

(21) Appl. No.: 13/109,650

(22) Filed: May 17, 2011

(51) Int. Cl.
*H04B 1/00* (2006.01)

(52) U.S. Cl.
USPC .......................................................... 370/328

(58) Field of Classification Search
None
See application file for complete search history.

(56) References Cited

U.S. PATENT DOCUMENTS

| | | | | |
|---|---|---|---|---|
| 7,440,509 B2* | 10/2008 | Baum | | 375/260 |
| 8,068,845 B2* | 11/2011 | Wengerter et al. | | 455/453 |
| 8,126,030 B2* | 2/2012 | Klomsdorf et al. | | 375/141 |
| 2002/0058513 A1* | 5/2002 | Klein et al. | | 455/447 |
| 2002/0119781 A1* | 8/2002 | Li et al. | | 455/450 |
| 2006/0120473 A1* | 6/2006 | Baum | | 375/260 |
| 2009/0221297 A1* | 9/2009 | Wengerter et al. | | 455/453 |
| 2010/0062705 A1* | 3/2010 | Rajkotia et al. | | 455/1 |
| 2010/0136998 A1* | 6/2010 | Lott et al. | | 455/453 |
| 2010/0234040 A1* | 9/2010 | Palanki et al. | | 455/452.2 |
| 2011/0002371 A1* | 1/2011 | Forenza et al. | | 375/227 |
| 2012/0093108 A1* | 4/2012 | Wengerter et al. | | 370/329 |
| 2012/0289278 A1* | 11/2012 | Huschke et al. | | 455/522 |

* cited by examiner

*Primary Examiner* — Chirag Shah
*Assistant Examiner* — Jael Ulysse

(57) ABSTRACT

A radio access network (RAN) may transmit on a plurality of channels, each channel made up of a plurality of subcarriers. Each subcarrier defines a sequence of frames, each frame respectively defining a sequence of time slots. The RAN may transmit symbols in each time slot at at least a nominal power level on each of the subcarriers. The RAN may also determine a subcarrier that is likely to cause adjacent carrier interference between a first wireless device and a second wireless device. The RAN may also transmit null symbols in a first time slot of an initial frame on the determined subcarrier with a power level less than the nominal power level. Additionally the RAN may transmit subsequent symbols with the respective power level of each of the subsequent symbols is successively increased for each subsequent timeslot, for at least the duration of the initial frame.

28 Claims, 6 Drawing Sheets

MINIMIZING ADJACENT CARRIER INTERFERENCE BY VARYING THE POWER LEVEL OF SUBCARRIERS

BACKGROUND

A radio access network (RAN) typically includes base transceiver stations (BTSs), each of which radiate to define one or more wireless coverage areas. In each coverage area, the RAN may transmit on a plurality of channels, each channel defined by a frequency. For each channel in the plurality of channels, the RAN may transmit on a plurality of subcarriers within the channel. For example, the RAN may use orthogonal frequency-division multiplexing (OFDM) to transmit on multiple subcarriers within a channel. OFDM is used in wireless communication systems such as IEEE 802.11 (WiFi) systems, IEEE 802.16 (WiMAX) systems, and systems that use the Long Term Evolution (LTE) specifications of the 3rd Generation Partnership Project (3GPP).

In the OFDM approach, data is organized into symbols that are used to modulate a plurality of sub-carriers. The subcarriers are spaced apart in frequency by a subcarrier spacing, $\Delta f$. Each subcarrier in the channel may define a sequence of frames, with each frame having a duration of T. Further, each frame may be divided into a sequence of time slots, with each time slot having a duration of t. Within each time slot, the symbols containing data may be transmitted in parallel on the subcarriers. Additionally, the RAN may transmit symbols at a nominal power level in each of a plurality of the time slots.

Each wireless communication device (WCD) may use one or more channels in the plurality of channels for the transmission of voice and data. For example, a WCD may simultaneously transmit voice on a first channel and data on a second channel. Additionally, the WCD may transmit data on several channels at once to maximize data throughput. The RAN may assign one or more channels to each WCD based on network capacity, RF channel conditions, or data throughput needs. Furthermore, channel assignments associated with the various WCDs in a coverage area may change with every subsequent frame.

OVERVIEW

While the aforementioned channel assignment procedure may successfully establish call and/or data connections in some scenarios, in other scenarios the procedure may lead to interference between two WCDs operating on adjacent channels. Further, the interference between the two WCDs may degrade the performance of both WCDs.

Each coverage area may only contain a finite number of channels. Therefore, if several WCDs are operating in the same coverage area, two may be operating on adjacent channels. The RAN may try to assign channels in order to minimize adjacent channel interference. As the number of WCDs and assigned channels increases, however, the ability to mitigate interference through channel assignments may decrease. Disclosed herein are methods for the mitigation of interference between wireless devices operating on adjacent channels.

Interference on a subcarrier may be measured with a signal-to-noise ratio. A signal-to-noise ratio (SNR) is the ratio of a desired signal to the interference. The interference, also known as noise, may be ambient radio frequency (RF) noise, signals transmitted in an adjacent channel, or both. A high SNR indicates low interference for a specific subcarrier. In some transmission systems, the presence of interference on a subcarrier may result in a low SNR. When the SNR drops below a threshold value, the RAN may use a lower order modulation to encode data on the subcarrier. The lower order modulation may result in a lower data rate on the subcarrier. If the interference is strong enough, the SNR may decrease to the point where communication on the subcarrier may be completely prevented.

A WCD may be able to adapt to some interference, but the sudden introduction of interference may block communication. The methods presented herein give a system more time to adapt to interference conditions by slowly increasing the power level of a first subcarrier when the first subcarrier potentially interferes with a second subcarrier. When the power level of the first subcarrier is increased, the interference may reduce the SNR for the second subcarrier. Slowly increasing the power level of the first subcarrier, thus slowly decreasing the SNR of the second subcarrier, may reduce impact of the interference on the second subcarrier, by better allowing WCDs on the second subcarrier to adapt to the adjacent subcarrier interference.

In one example, the system may identify two subcarriers, the first being a potentially interfering subcarrier and the second being a desired subcarrier. The system may adapt to interference conditions by slowly increasing the power level of a potentially interfering subcarrier, thus slowly decreasing the SNR for the desired subcarrier. By slowly decreasing the SNR for the desired subcarrier, the impact of the interference may be reduced for the desired subcarrier, by allowing WCDs on the desired subcarrier to better adapt.

In order to reduce the effect of adjacent channel interference and the resulting low SNR, the RAN may monitor transmissions to determine when adjacent channel interference is likely. In response to the determination that interference is likely, the RAN may vary the power level of potentially interfering subcarriers to attempt to reduce the impact of the interference. First, the RAN may lower the power level of potentially interfering subcarriers. Next, the RAN may slowly increase the power level of the potentially interfering subcarriers. By allowing more time for the WCD to adapt to potential interference, the likelihood that communication is prevented may be reduced.

The RAN may determine, from among the plurality of subcarriers, at least one subcarrier that is likely to cause adjacent carrier interference between a first wireless device and a second wireless device. For example, the first wireless device may be operating on a first channel and the second wireless device may be operating on a second channel. If the channels are adjacent to each other, i.e. the frequency band associated with the first channel borders the frequency band associated with the second channel, subcarriers associated with the first channel may interfere with subcarriers associated with the second channel. Alternatively, both wireless devices may be operating on the same channel but may have different subcarrier assignments. When the subcarriers assigned to one WCD are adjacent to subcarriers assigned to the other WCD, the subcarriers may interfere with each other.

In response to identifying at least one potentially interfering subcarrier, the RAN may transmit null symbols, symbols with no data payload, on the at least one potentially interfering subcarrier. Further, the RAN may transmit the null symbols with a power level less than the nominal power level associated with the subcarrier. For example, the power level less than the nominal power level may be less than 20 dBm (100 mW). Moreover, the RAN may start transmitting null symbols in a first time slot of an initial frame.

The RAN may then transmit subsequent symbols on the potentially interfering subcarrier with successively increased power levels. Thus, with each subsequent timeslot, the RAN may increase the power level of the symbols transmitted on the subcarrier. For example, for each subsequent timeslot of the initial frame, the RAN may increase the power level of the symbols transmitted on the potentially interfering subcarrier by 1.5 dB. The RAN may successively increase the respective power level transmitted until the power level reaches or exceeds a threshold power level. For example, the threshold power level may be 3 dB below the nominal power level of subcarriers for the given channel. Therefore, in the example, the potentially interfering subcarriers will have a threshold power level that is half the power of the nominal subcarrier power for the channel.

In other examples, the RAN may successively increase the respective power level for each of the subsequent symbols based on the frequency associated with each potentially interfering subcarrier. For example, subcarriers with a frequency close to the channel edge may have the extent of each incremental power increase less than the extent of the incremental power increase for subcarriers further from the channel edge. Subcarriers located near the channel edge may be more likely to cause adjacent channel interference. Thus, it may be desirable to increase the power level more slowly of subcarriers based on how close a subcarrier is located to an adjacent channel.

In some examples, the RAN may first determine a current sector loading and perform some or all of the method steps responsive to the current sector loading exceeding a trigger condition. The trigger condition may be defined by (i) a predetermined number of wireless devices operating in the coverage area, (ii) a loading percentage in the coverage area, or (iii) subcarriers associated with the first wireless device and subcarriers being associated with the second wireless device. In other examples, the RAN may always perform the method steps, regardless of the trigger condition.

Furthermore, in some examples, the RAN may keep the total power transmitted in a channel substantially constant. The total power transmitted in each channel may be the sum of the power transmitted on each subcarrier associated with the channel. Thus, responsive to a power increase to some extent on one subcarrier, the RAN may decrease the sum total power transmitted on the other subcarriers by the same extent.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Example Communication System Architecture

Figure 1:
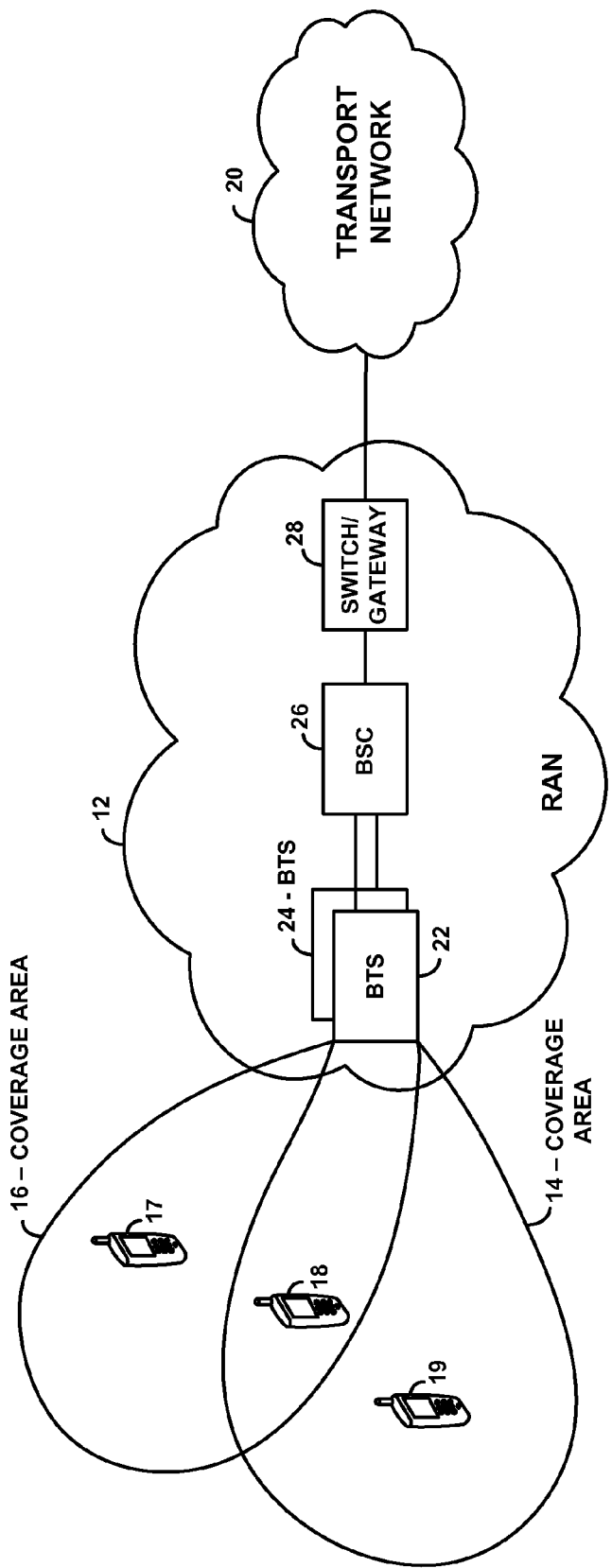
FIG. 1 is a simplified block diagram of a communications network.

Referring to the drawings, FIG. 1 is a simplified block diagram of a communications network in which at least one embodiment of the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, a processor executing program instructions stored in memory or another such non-transitory machine-readable medium may carry out various functions.

As shown in FIG. 1, the exemplary network includes at its core a radio access network (RAN) 12 that radiates to define a plurality of wireless coverage areas, including representative coverage areas 14 and 16. Shown operating in the various coverage areas by way of example are wireless communication devices (WCDs) 17, 18, 19, which communicate over the air with the RAN 12. A WCD, such as WCD 18, may be under the coverage of both coverage areas 14 and 16. In practice, RAN 12 may also be coupled with one or more transport networks, such as representative network 20. With this arrangement, each served WCD can engage in wireless communication with the RAN and may thereby communicate with other entities, such as other WCDs served by the RAN or with entities on transport network 20. Other RANs (not shown) may exist as well.

RAN 12 can generally take any form, the particular details of which are not critical to this disclosure. At a rudimentary level, for instance, the RAN may comprise a simple wireless access point router or switch, which communicates on one side with served WCDs and connects on the other side with the transport network, or merely provides connectivity between WCDs.

At a more complex level (as shown), but still by way of example, the RAN may be a cellular radio access network. As shown, such a network may have a plurality of base transceiver stations (BTSs) (or more generally "base stations"), including representative BTSs 22 and 24, each of which provides antenna elements that radiate to define a respective coverage area and perhaps a set of coverage areas. In that arrangement, each of the coverage areas 14 and 16 may comprise one or more cells and/or cell sectors for instance. In one example, coverage area 14 may correspond to an area defined by a radiation pattern of BTS 22, while coverage area 16 may correspond to an area defined by a radiation pattern of BTS 24. In another example, coverage areas 14 and 16 may each correspond to areas defined by radiation patterns of the same BTS (e.g., BTS 22). The BTSs are in turn shown coupled with a base station controller (BSC) 26, which is then coupled with a switch or gateway 28 that provides connectivity with transport network 20.

In some systems, BSC 26 may manage various aspects of air-interface operation, such as handoffs between BTSs or the like. The BSC may be integrated with a BTS to cooperatively define a "base station," or either component may be considered to provide "base station" functionality. Further, in some systems, a radio network controller (RNC) or other such component can provide similar functionality.

Switch/gateway 28 may manage functions such as handoffs between BSC governed coverage areas or the like. Further, as noted above, the switch/gateway may provide connectivity with a transport network. For instance, a switch such as a mobile switching center (MSC) or media gateway may provide connectivity with the public switched telephone network (PSTN), and a gateway such as a packet data serving node (PDSN) may provide connectivity with a packet-switched network such as the Internet.

RAN 12 may operate according to an orthogonal frequency-division multiplexing (OFDM) protocol such as IEEE 802.11 (WiFi) systems, IEEE 802.16 (WiMAX) systems, systems that use the Long Term Evolution (LTE) specifications of the 3rd Generation Partnership Project (3GPP), and/or any other wireless protocol or protocols now known or later developed.

An air interface protocol will generally define a "forward link" encompassing communications from the BTS to active WCDs and a "reverse link" encompassing communications from active WCDs to the BTS. Further, each of these links may be structured such that multiple WCDs can simultaneously communicate with the serving BTS, through use of time division multiplexing, code division multiplexing (e.g., spread-spectrum modulation), frequency division multiplexing, and/or some other mechanism.

The forward link, for example, may define various subchannels including (i) a pilot channel on which the RAN may broadcast a pilot signal to allow WCDs to detect wireless coverage, (ii) system parameter channels (e.g., an overhead channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs during a communication session. And the reverse link, for example, may define various sub-channels including (i) access channels on which WCDs may transmit "access attempts" such as registration messages and/or call origination requests, and (ii) traffic channels on which WCDs may transmit bearer traffic for receipt by the RAN during a communication session.

II. Example Network Device

Figure 2:
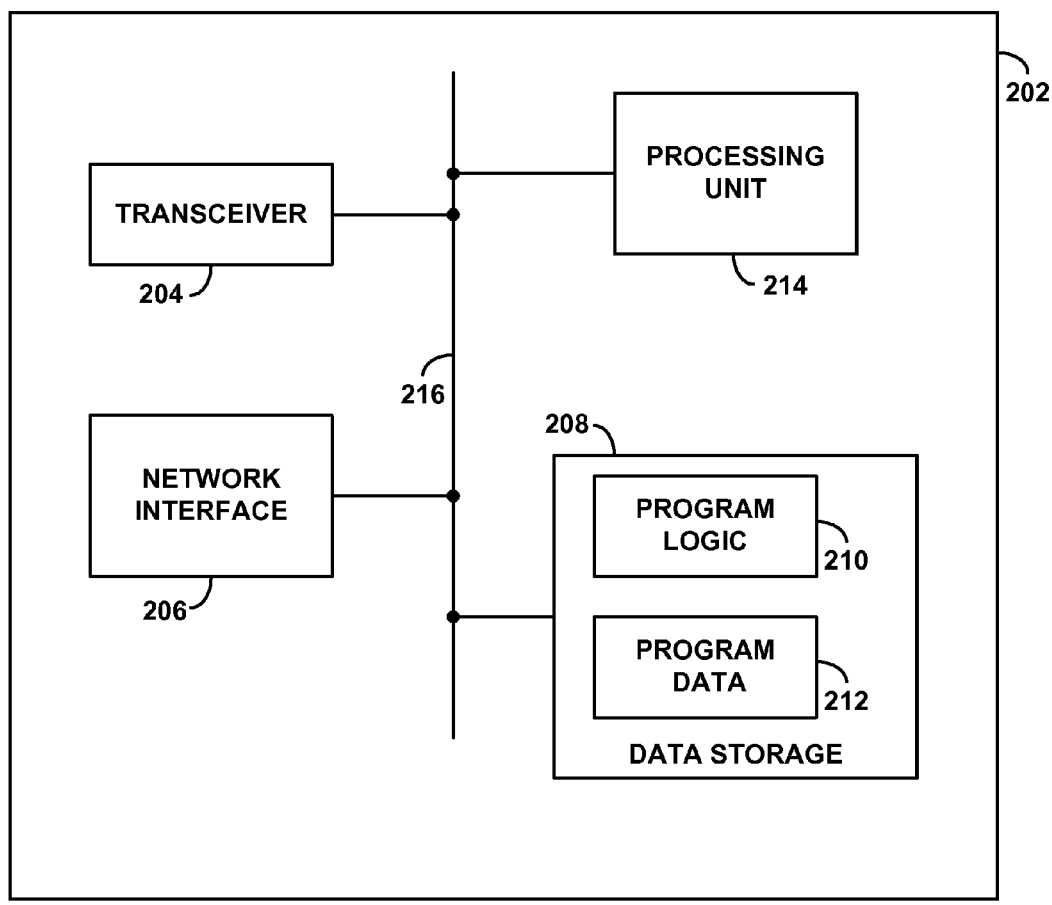
FIG. 2 is a simplified block diagram depicting functional components of an example network device.

Those skilled in the art will appreciate that there can be numerous specific implementations of a network device that may be used in connection with at least one embodiment of the method described herein. By way of example, FIG. 2 is a simplified block diagram depicting functional components of an example network device or system 202 that may be arranged to carry out network-side functions described herein.

The example network device 202 may be representative of BTS 22/24, BSC 26, switch/gateway 28, BSC 26 integrated with BTS 22/24, and/or some other entity associated with transport network 20 in FIG. 1, for instance. As shown in FIG. 2, network device 202 includes a transceiver 204, a network interface 206, a processing unit 214, and data storage 208, all of which may be coupled by a system bus 216 or other mechanism. In addition, the network device may also include external storage, such as magnetic or optical disk storage, although this is not shown in FIG. 2.

These components may be arranged to support conventional operation of BTS 22/24, BSC 26, or switch/gateway 28 in a wireless-communication network, such as RAN 12 illustrated in FIG. 1. Certain aspects of network device 202 relevant to the functions discussed herein are discussed briefly below.

Transceiver 204 may include one or more antennas that radiate to define a coverage area (e.g., coverage area 16) in which WCDs may operate. Transceiver 204 in combination with network interface 206 may enable the network device 202 to communicate with WCDs on a network, such as RAN 12. For example, network interface 206 in combination with transceiver 204 may enable network device 202 to transmit a radio forward-link communications to WCDs, and receive a radio reverse-link communication from WCDs. Network interface 206 may take the form of trunk or optical link that can be coupled with switch/gateway 28, or any Ethernet network interface card or other physical connection that can be coupled with any other entity on the RAN 12 or transport network 24. By way of example, the interface 206 may include a module, such as an OFDM chipset, and may support wireless packet-data communications according to OFDM modulation schemes.

Processing unit 214 comprises one or more general-purpose processors (e.g., INTEL microprocessors) and/or one or more special-purpose processors (e.g., dedicated digital signal processor, application-specific integrated circuit, etc.) and may be integrated in whole or in part with the transceiver 204 or with other RAN components. In turn, the data storage 208 comprises one or more volatile and/or non-volatile storage components, such as magnetic or optical memory or disk storage. Data storage 208 can be integrated in whole or in part with processing unit 214, as cache memory or registers for instance. As further shown, data storage 208 is equipped to hold program logic 210 and program data 212. Program logic 210 may comprise machine-language instructions that define routines executable by processing unit 214 to carry out various functions described herein. Additionally, program data 212 may comprise reference data established and/or used during the execution of program logic 210 by processing unit 214.

III. Example Communication Structure

The present method will be described by way of example with reference to orthogonal frequency-division multiplexing (OFDM) communications. However, it should be understood that the method can also apply with respect to other families of protocols now known or developed in the future.

Figure 3A:
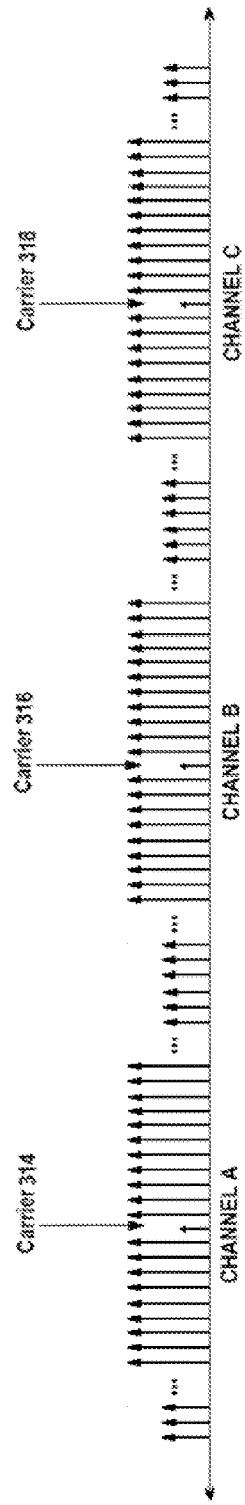
FIG. 3A depicts three example channels in a frequency band of an OFDM wireless network.

In an OFDM wireless network, each wireless coverage area may employ one or more frequency bands, with each frequency band being further divided into frequency channels. FIG. 3A depicts three example channels in a frequency band of an OFDM wireless network. The three channels in FIG. 3A may each be defined by a center frequency, i.e. carrier frequency. For example, FIG. 3A has Channel A, Channel B, and Channel C having respective carrier frequencies 314, 316 and 318.

The carrier frequencies of adjacent channels may be separated by F Megahertz (MHz). Channel spacing may also be known as channel bandwidth. For example in an LTE system, some common channel spacing may be 1.4 MHz, 3 MHz, 5 MHz, 10 MHz, 15 MHz, and 20 MHz. In FIG. 3A, the horizontal axis of the figure may represent frequency. For example, the carrier frequency associated with Channel A may be 815 MHz. The adjacent channel, Channel B, may have a carrier frequency of 815+F MHz, depending on the chosen frequency spacing F. Further, Channel C may have a carrier frequency of 815+2F MHz.

Figure 3B:
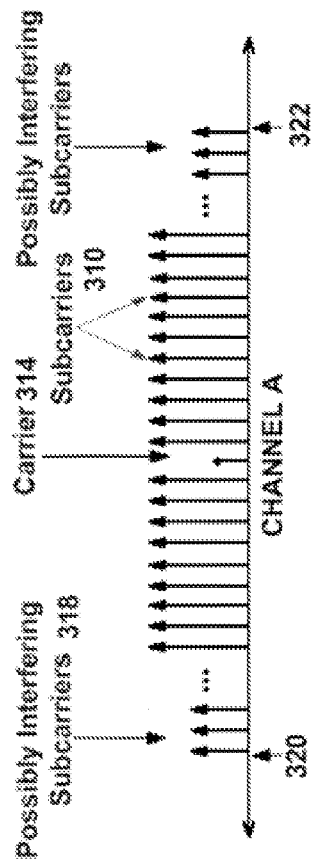
FIG. 3B shows an example structure of a single channel.

FIG. 3B shows an example structure of a single channel. Channel A may have a carrier frequency 314. Channel A may also have a plurality of subcarriers 310. Each subcarrier may be defined by a specific frequency. The sub-carriers are spaced apart in frequency by a subcarrier spacing, $\Delta f$. For example in LTE, the subcarrier spacing may be 15 kilohertz (kHz). Thus, a channel with a bandwidth of 15 MHz may contain up to 1000 subcarriers. The subcarriers may be chosen so that each is orthogonal with the others. Due to the orthogonality, under ideal circumstances there is no interference between subcarriers.

Channel A also has two channel edges, 320 and 322. The edges of the channel are the frequencies where Channel A is directly adjacent to its neighboring channels. For example, the frequency corresponding to the upper edge 322 of Channel A is Carrier Frequency 314 plus half of the channel bandwidth (frequency spacing) F. Conversely, the frequency corresponding to the low edge 320 of Channel A is Carrier Frequency 314 minus half of the channel bandwidth (frequency spacing) F.

In some examples, subcarriers that correspond to a frequency that is close to the channel edge may cause interference with subcarriers on the adjacent channel. The interference between subcarriers may be known as inter-carrier interference (ICI). Subcarriers losing perfect orthogonality, typically due to a frequency offset, may cause ICI. The RAN may be able to identify situations when ICI is likely. The program logic 210 and/or program data 212 may define an algorithm to identify at least one subcarrier that may possibly cause interference.

In other examples, the RAN may identify a group of subcarriers possibly causing interference. In some examples, the 25 subcarriers closest to the edge of the channel may be possibly interfering subcarriers 318. In other examples, the RAN may vary the number of subcarriers in a group closest to the edge of the channel. The number of subcarriers may be determined by the program logic 210 based on the number of based on radio conditions of the wireless link (i.e. multipath, fading, noise, Doppler shift, etc.), number of users in a coverage area, or other criteria.

In practice, the RAN transmits on each subcarrier with an associated power level. In FIG. 3B, the height of subcarriers 310 represents a power level associated with each subcarrier. In some examples, the RAN may transmit subcarriers at a nominal power level that is substantially constant across the subcarriers. The RAN may set the nominal power level based on a number of criteria. For example, the RAN may determine the nominal power level based on radio conditions of the wireless link, number of users in a coverage area, or other criteria.

Additionally, the RAN may vary the power level of subcarriers based on a subcarrier grouping. The subcarriers may be grouped based on a resource grid, as will be described below with respect to FIG. 4B. In one example, the RAN may identify a group of subcarriers 318 that may possibly cause interference with subcarriers on another channel. Responsively the RAN may transmit those possibly interfering subcarriers at a power level lower than the nominal power level.

The program data 212 may contain data that specifies groups of subcarriers. The grouping of subcarriers may be predetermined or the program logic 210 may contain instructions to group subcarriers. For example, the program logic 210 may group subcarriers based on RF conditions on a channel, a number of users on a channel or other criteria. Additionally, the program logic 210 may contain instructions that when executed by the processing unit 214 identify a subcarrier that may cause interference with another subcarrier. The program logic 210 may identify a subcarrier that may cause interference with another subcarrier based on the subcarrier spacing and based on radio conditions of the wireless link. The program data 212 may store a list of potentially interfering subcarriers. The program data 212 may also contain instructions that label all subcarriers within a group of subcarriers as possibly interfering as long as one subcarrier in the group was determined to be interfering. Thus, all the subcarriers in a group may be treated in a same manner.

Figure 4A:
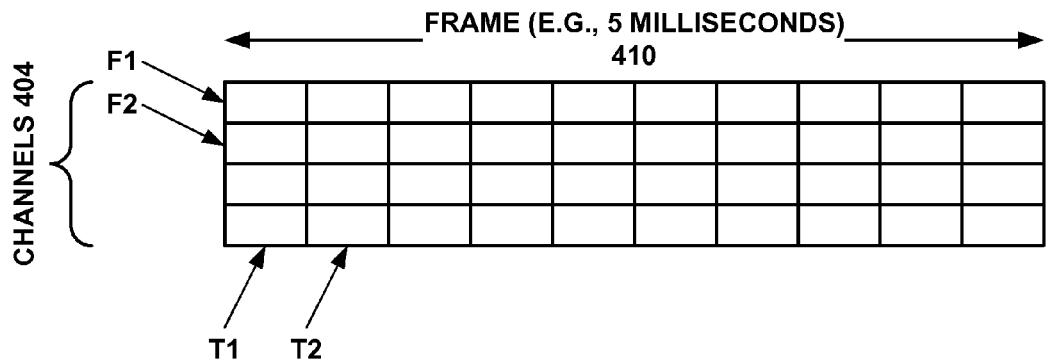
FIG. 4A depicts example resource map for use with an OFDM communication system.

In some OFDM systems, each WCDs is assigned at least one individual channel for data transmission. In order to allocate system resources, frequencies and time, the RAN may use a resource map, resource grid, and resource block. FIG. 4A depicts example resource map for use with an OFDM communication system. The resource map may be a two-dimensional visual mapping of (i) channels 404 within a frequency band and (ii) time slots T1 and T2 within a frame 410. The resource map forms a grid, with each cell having an associated channel and a time slot.

Along a first axis, the resource map may have channels 404. Each channel in a given frequency band, here shown as F1 and F2 for example, may correspond to a carrier frequency associated with each channel. Thus, each channel in a frequency band may be a contiguous block of frequencies, where there is no overlap between the frequencies associated with the various channels. Each channel may further be divided into subcarrier groups 424, shown in FIG. 4B.

Figure 4B:
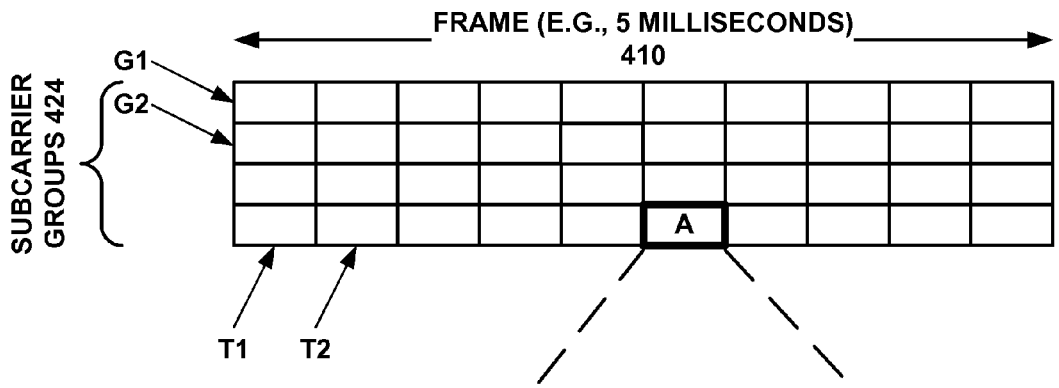
FIG. 4B depicts an example resource grid for use with an OFDMA communication system.

Along a second axis of the resource map is an amount of time equal to one frame 410. An example frame may last 5 milliseconds (ms) as shown in FIG. 4A and FIG. 4B. Each frame may further be divided into time slots. For example, a frame 410 may be divided into 10 time slots 460, the first two of which are T1 and T2. Within each time slot, the RAN may transmit data with symbols.

In a specific version of OFDM systems, known as Orthogonal Frequency-Division Multiple Access (OFDMA), each channel may further be divided into groups of subcarriers. Each WCD is assigned at least one group of subcarriers for data transmission. An OFDMA system may allow more degrees of freedom when assigning resources to WCDs. By using OFDMA, a RAN may be able to transmit to a WCD with a higher data rate, as well as communicate with more WCDs simultaneously.

Each channel in the resource map may be divisible into a resource grid. FIG. 4B depicts an example resource grid for use with an OFDMA communication system. An OFDMA resource grid is similar to an OFDM resource map, except the OFDMA resource grid shows a mapping of subcarrier groups rather than channels. A resource grid may be two-dimensional visual mapping of (i) groups of subcarriers 424 within one frequency channel F1 and (ii) time slots T1 and T2 within a frame 410. The resource map forms a grid, with each cell having an associated group of subcarriers and a time slot.

Each group of subcarriers G1 and G2 may contain a predetermined number of subcarriers. For example, each group of subcarriers may contain 12 subcarriers. In some embodiments, the number of subcarriers assigned to a group may be varied. The RAN may determine the number of subcarriers to assign to groups based on radio conditions on the channel or based on other criteria. Additionally, each group of subcarriers does not overlap with any of the other groups of subcarriers. Each subcarrier can only be assigned to one group.

Figure 4C:
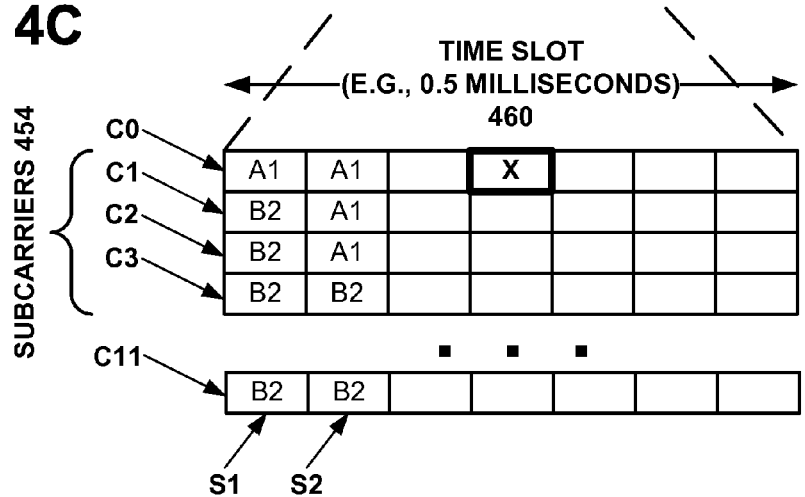
FIG. 4C depicts an example resource block for use in an OFDMA communication system.

Each cell in FIG. 4B, such as Cell A, is a resource block. FIG. 4C depicts an example resource block for use in an OFDMA communication system. A resource block may a two-dimensional visual mapping of (i) individual subcarriers C0, C1, etc. along the first axis and (ii) a time slot 460 divided into symbol periods S1 and S2 along the second axis. Each cell in FIG. 4C, such as Cell X, may be considered a resource element. Each resource element may correspond to one symbol for transmission on a subcarrier by the RAN.

In the example resource block shown in FIG. 4C, the amount of time may be considered one time slot 460. An example time slot may have a period of 0.5 milliseconds (ms). The time slot 460 may be further divided into symbol periods. For example, one time slot may be equivalent to the duration of seven symbol periods. Although each frame is typically divided into 6 or 7 symbol periods, the number of symbol periods may be varied. The first two symbol periods of time slot 460 are shown as S1 and S2.

The RAN may transmit data with symbols on each subcarrier within each symbol period. The RAN my also dynamically assign each resource block to the various WCDs associated with the RAN. The resource blocks may be assigned based on channel conditions, a data rate for the mobile device, or based on other criteria.

As shown in FIG. 4C, the RAN may assign each resource element to a WCD for the duration of each symbol. For example, subcarrier groups C1 and C2 may be assigned to WCD B2 for the duration of symbol S1 and be assigned to WCD A1 for the duration of symbol S2. A group of subcarriers may be assigned to one WCD for more than the duration of one symbol as well, as shown by subcarriers C0, C3, and C11. Thus, the RAN may be able to reassign resource elements for each subsequent symbol period. The RAN may also reassign resource elements for each subsequent time slot.

IV. Mitigating Adjacent Carrier Interference by Varying the Power Level of Subcarriers As noted above, subcarriers losing perfect orthogonality, typically due to a frequency offset, may cause ICI. Mismatched transmitter and receiver oscillators, Doppler shift, and multipath may cause the frequency offset. For example, a WCD in motion in a reflective environment may receive subcarriers with each subcarrier having frequency offsets due to both multipath and Doppler shift. The frequency offsets may manifest themselves as a reduction in the orthogonality of the subcarriers.

When orthogonality is lost, introducing ICI, a receiver may have a more difficult time decoding the data. The decoded data may have a higher error rate or, if the ICI is severe, decoding may be impossible. Thus, an OFDM system may have decreased performance when in motion or in multipath environments.

As noted above, interference on a subcarrier may be measured with a signal-to-noise ratio. In some transmission systems, the presence of interference on a subcarrier may result in a low SNR. When the SNR drops below a threshold value, the RAN may use a lower order modulation to encode data on the subcarrier. The lower order modulation may result in a lower data rate on the subcarrier. If the interference is strong enough, the SNR may decrease to the point where communication on the subcarrier may be completely prevented.

In current systems, a WCD may be able to adapt to some interference, but the sudden introduction of interference may block communication. The methods presented herein give a system more time to adapt to interference conditions by slowly increasing the interference for a subcarrier that is associated with the WCD.

As noted above, the program data 212 may store a list of potentially interfering subcarriers. The list of potentially interfering subcarriers may either be predetermined or determined by the program logic 210. The program logic 210 may contain instructions that when executed by the processing unit 214 identify a subcarrier that may cause interference with another subcarrier. In some embodiments, the program logic 210 may determine, from among the plurality of subcarriers, at least one subcarrier that is likely to cause adjacent carrier interference between a first wireless device and a second wireless device. For example, the first wireless device may be operating on a first channel and the second wireless device may be operating on a second channel. If the channels are adjacent to each other, i.e. the frequency band associated with the first channel borders the frequency band associated with the second channel, subcarriers with an associated frequency located near the edge of the first channel may interfere with subcarriers with an associated frequency located near the edge of the second channel.

Additionally, in some communication systems, such as OFDMA systems, both WCDs may be operating on the same channel, but have adjacent resource element assignments, i.e. the subcarriers associated with the first resource element border the subcarriers associated with the second resource element. When the resource elements are adjacent to each other, subcarriers associated with the first resource element may interfere with subcarriers associated with the second resource element.

For the purposes of the methods disclosed herein, whether the potentially interfering subcarriers are in the same, or different channels may not be an issue. As long as a subcarrier may potentially interfere with a subcarrier assigned to a different WCD, the disclosed method may apply. In some examples, the potentially interfering subcarriers may be located in adjacent channels. While in other examples, the potentially interfering subcarriers may be located in the same channel, but located within adjacent resource elements.

In response to the program logic 210 having at least one identified potentially interfering subcarrier or program data 212 having a stored interfering subcarrier, the RAN may transmit null symbols, symbols with no data payload, on the at least one potentially interfering subcarrier. The RAN may transmit the null symbols with a power level less than the nominal power level associated with the subcarrier. For example, the power level less than the nominal power level may be less than 20 dBm (decibels relative to 1 mW, that is 100 mW), or other power levels less than the nominal power level. Moreover, after an interfering subcarrier is identified, the RAN may start transmitting null symbols in a first time slot of an initial frame. The initial frame may be the next subsequent frame after the program logic 210 identifies a potentially interfering subcarrier.

After the transmission of the null symbol, the RAN may transmit data on subsequent symbols. Additionally, the RAN may successively increase the power level of the potentially interfering subcarrier. The successive increase of the power level slowly increases the interference on the adjacent subcarrier. The RAN may increase the power level with every subsequent time slot for the duration of a frame. The RAN may also increase the power level after a different amount of time. For example, the power level may be increased for each subsequent symbol, for every second time slot, or for every subsequent frame. Therefore, by allowing more time for the WCD to adapt to potential interference by slowly increasing the power level, the likelihood that communication is prevented may be reduced.

Additionally, the successive increases in the power level may be a fixed increase for every step. For example, with each increase, the power level is increased by 1.5 decibel (dB). In other examples, the power steps may vary. The first power increase may be small and increased with each subsequent power increase. For example, the first power increase may be 0.5 dB, the second may be 1.0 dB, the third 1.5 dB and so on. The power increases may be dependent on the type of receiver used in the WCD and how susceptible it is to interference. In specific examples when interference must be kept very low, the power steps may be smaller.

Figure 5:
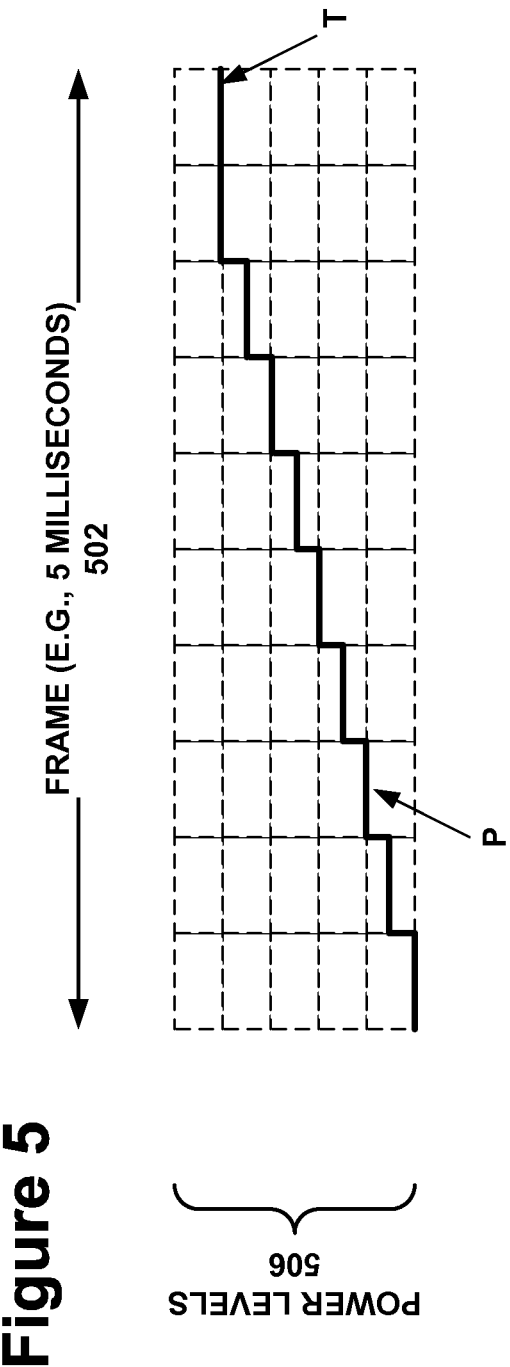
FIG. 5 depicts an example transmission power level P of a potentially interfering subcarrier, and, FIG. 6 is a flow chart of a method for minimizing adjacent carrier interference by varying the power level of subcarriers, in accordance with an example embodiment.

FIG. 5 depicts an example transmission power level P of a potentially interfering subcarrier. The subcarrier may have a plurality of possible power levels 506. In one specific example, for each subsequent timeslot of the initial frame, the RAN may increase the power level of the symbols transmitted on the potentially interfering subcarrier by 1.5 dB. In the example, the RAN successively increases the respective power level until the power level meets or exceeds a threshold power level T. In some examples, the RAN may continue to transmit at the threshold power level T for the subsequent frame. The RAN may also repeat the method for each subsequent frame.

Furthermore, the RAN may successively increase the respective power level until the power level meets or exceeds a predetermined threshold power level. The predetermined threshold power level may be chosen to help keep the SNR of an adjacent subcarrier high enough to allow communication. For example, the threshold power level may be chosen to keep the SNR of a subcarrier above a specific limit. The SNR may be chosen based on a modulation associated with the SNR. In other examples, the RAN may successively increase the respective power level for each of the subsequent symbols based on the frequency associated with each potentially interfering subcarrier.

Subcarriers located near the channel edge may be more likely to cause adjacent channel interference. In an example method, subcarriers with a frequency close to the channel edge may have the extent of each incremental power increase less than the extent of the incremental power increase for subcarriers further from the channel edge. Thus, it may be desirable to increase the power level more slowly of subcarriers based on how close a subcarrier is located to an adjacent channel.

In some examples, the RAN may only perform the methods after first determining that a current sector loading exceeds a trigger condition. The trigger condition may be defined by (i) a predetermined number of wireless devices operating in the coverage area, (ii) a loading percentage in the coverage area, or (iii) subcarriers associated with the first wireless device and subcarriers being associated with the second wireless device. In other examples, the RAN may always perform the method steps when subcarriers may potentially interfere with each other.

Furthermore, in some examples, the RAN may keep the total power transmitted in a channel substantially constant. The total power transmitted in each channel may be the sum of the power transmitted on each subcarrier associated with the channel. Thus, when the power is increased to some extent on one subcarrier, the RAN may decrease the sum total power transmitted on the other subcarriers by the same extent.

Figure 6:
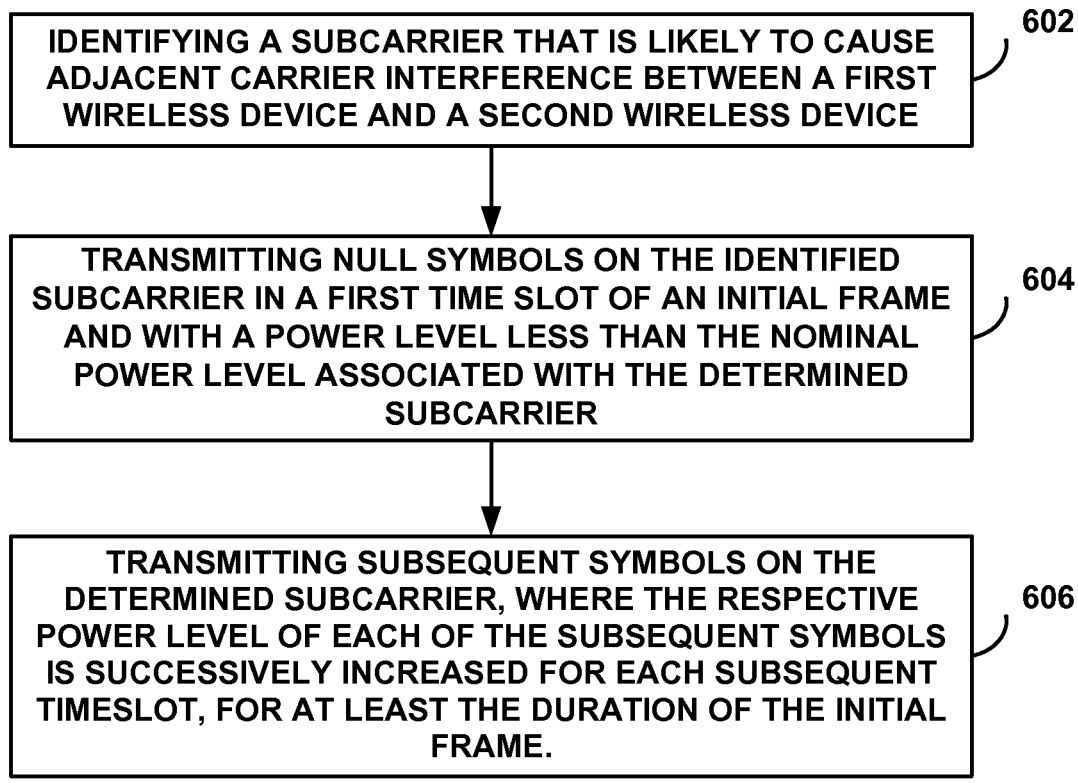

FIG. 6 is a flow chart of a method for minimizing adjacent carrier interference by varying the power level of subcarriers. The method shown in FIG. 6 presents one way of carrying out the methods described herein. The method of FIG. 6 may begin with 602, when the RAN identifies a subcarrier that is likely to cause adjacent carrier interference. The adjacent carrier interference may be between a first wireless device and a second wireless device. In some examples, the first wireless device may operate on a first resource element and the second wireless device may operate on a second resource element. The first and second resource elements may contain subcarriers be adjacent to each other.

At block 604 of the method, the RAN may transmit null symbols on the identified subcarrier. The null symbols are transmitted in the first time slot of an initial frame. Additionally, the null symbols are transmitted with a power level lower than the nominal power level for subcarriers. A null symbol may be a symbol that does not contain data.

Finally, at block 606, the RAN may transmit subsequent symbols, each containing data, on the potentially interfering subcarrier. The RAN may successively increase the power level of the subcarriers containing the symbols for each subsequent time slot. The RAN may continue to increase the power level of the symbols transmitted on the subcarrier for at least the duration of the initial frame. In some examples, the RAN may continue to increase the power level with each subsequent time slot until a threshold power level is reached.

It should be understood that the flow chart of FIG. 6 is a non-limiting embodiment. Thus, more or fewer steps than shown in FIG. 6 may be used without departing from the scope of the methods. Additionally, any of these steps may be repeated one or more times, or may be omitted altogether. Moreover, these steps may occur in a different order than shown in FIG. 6.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
 (i) a radio access network (RAN) transmitting on a plurality of channels;
 (ii) for each channel in the plurality of channels, the RAN transmitting on a plurality of subcarriers, wherein each subcarrier defines a sequence of frames, each frame respectively defining a sequence of time slots, wherein the RAN transmits symbols in each of a plurality of the time slots, and wherein the RAN normally transmits at at least a nominal power level on each of the subcarriers;
 (iii) identifying, from among the plurality of subcarriers, a subcarrier that is likely to cause adjacent carrier interference between a first wireless device operating on a first group of subcarriers and a second wireless device operating on a second group of subcarriers,
 (iv) transmitting null symbols on the identified subcarrier, wherein the null symbols are transmitted: (a) in a first time slot of an initial frame; and, (b) with a non-zero power level less than the nominal power level associated with the identified subcarrier, and
 (v) transmitting subsequent symbols on the identified subcarrier, wherein the respective power level of each of the subsequent symbols is successively increased for each subsequent timeslot, for at least the duration of the initial frame.

2. The method of claim 1 further comprising:
 the RAN determining a current sector loading; and responsive to the determined current sector loading exceeding a trigger condition, the RAN performing (iii), (iv) and (v).

3. The method of claim 2, further comprising transmitting the subsequent symbols at or above the threshold power level for at least the duration of the initial frame.

4. The method of claim 2, wherein the trigger condition is defined by a predetermined number of wireless devices.

5. The method of claim 2, wherein the trigger condition is defined by a loading percentage in the sector.

6. The method of claim 1, wherein the respective power level of each of the subsequent symbols is successively increased for each subsequent timeslot until the power level reaches or exceeds a threshold power level.

7. The method of claim 6, wherein the threshold power level is 3 dB below the nominal power level of subcarriers for the given channel.

8. The method of claim 6, wherein the trigger condition is defined by a channel associated with the first wireless device and a channel associated with the second wireless device.

9. The method of claim 1, further comprising the RAN maintaining a record of a maximum total power transmitted in each channel, wherein the total power transmitted in each channel is a sum total of the power transmitted on each subcarrier in the plurality of subcarriers associated with the channel.

10. The method of claim 1, wherein the power level less than the nominal power level is less than 20 dBm.

11. The method of claim 1, wherein the respective power level of each of the subsequent symbols is successively increased by 1.5 dB for each subsequent timeslot.

12. The method of claim 1, wherein the successive increase of the respective power level of each of the subsequent symbols is based on a frequency associated with the determined subcarrier.

13. A network device including a non-transitory computer-readable medium, having stored thereon program instructions that, if executed by a radio access network (RAN), cause the RAN to perform operations comprising:
(i) for each channel in the plurality of channels, transmitting on a plurality of subcarriers, wherein each subcarrier defines a sequence of frames, each frame respectively defining a sequence of time slots, wherein symbols are transmitted in each of a plurality of the time slots, and wherein at least a nominal power level is normally transmitted on each of the subcarriers;
(ii) determining, from among the plurality of subcarriers, a subcarrier that is likely to cause adjacent carrier interference between a first wireless device operating on a first group of subcarriers and a second wireless device operating on a second group of subcarriers,
(iii) transmitting null symbols on the determined subcarrier, wherein the null symbols are transmitted: (a) in a first time slot of an initial frame; and, (b) with a non-zero power level less than the nominal power level associated with the determined subcarrier, and
(iv) transmitting subsequent symbols on the determined subcarrier, wherein the respective power level of each of the subsequent symbols is successively increased for each subsequent timeslot, for at least the duration of the initial frame.

14. The network device of claim 13 further comprising program instructions that, if executed by a radio access network (RAN), cause the RAN to perform operations comprising:
determining a current sector loading; and
responsive to the determined current sector loading exceeding a trigger condition, the RAN performing (ii), (iii) and (iv).

15. The network device of claim 14, wherein the trigger condition is defined by a predetermined number of wireless devices.

16. The network device of claim 14, wherein the trigger condition is defined by a loading percentage in the sector.

17. The network device of claim 14, wherein the trigger condition is defined by a channel associated with the first wireless device and a channel associated with the second wireless device.

18. The network device of claim 13, wherein the respective power level of each of the subsequent symbols is successively increased for each subsequent timeslot until the power level reaches or exceeds a threshold power level.

19. The network device of claim 18, further comprising transmitting subsequent symbols at or above the threshold power level for at least the duration of the initial frame.

20. The network device of claim 18, wherein the threshold power level is 3 dB below the nominal power level of subcarriers for the given channel.

21. The network device of claim 18, further comprising the RAN maintaining a record of a maximum total power transmitted in each channel, wherein the total power transmitted in each channel is a sum total of the power transmitted on each subcarrier of the plurality of subcarriers associated with the channel.

22. The network device of claim 13, wherein the power level less than the nominal power level is less than 20 dBm.

23. The network device of claim 13, wherein the respective power level of each of the subsequent symbols is successively increased by 1.5 dB for each subsequent timeslot.

24. The network device of claim 13, wherein the successive increase of the respective power level of each of the subsequent symbols is based on a frequency associated with the determined subcarrier.

25. A method comprising:
for each channel in the plurality of channels, transmitting on a plurality of subcarriers, wherein each subcarrier defines a sequence of frames, each frame respectively defining a sequence of time slots, wherein symbols are transmitted in each of a plurality of the time slots, and wherein at least a nominal power level is normally transmitted on each of the subcarriers;
determining, from among the plurality of subcarriers, a subcarrier that is likely to cause adjacent carrier interference between a first wireless device operating on a first group of subcarriers and a second wireless device operating on a second group of subcarriers;
determining a current sector loading; and
responsive to the determined current sector loading exceeding a loading threshold:
(i) transmitting null symbols on the determined subcarrier, wherein the null symbols are transmitted: (a) in a first time slot of an initial frame; and, (b) with a non-zero power level less than the nominal power level associated with the determined subcarrier, and
(ii) transmitting subsequent symbols on the determined subcarrier, wherein the respective power level of each of the subsequent symbols is successively increased for each subsequent timeslot, for at least the duration of the initial frame.

26. A method comprising:
(i) a radio access network (RAN) transmitting on a plurality of channels;

(ii) for each channel in the plurality of channels, the RAN transmitting on a plurality of subcarriers, wherein each subcarrier defines a sequence of frames, each frame respectively defining a sequence of time slots, wherein the RAN transmits symbols in each of a plurality of the time slots, and wherein the RAN normally transmits at at least a nominal power level on each of the subcarriers;

(iii) identifying, from among the plurality of subcarriers, a subcarrier that is likely to cause adjacent carrier interference between a first wireless device operating on a first group of subcarriers and a second wireless device operating on a second group of subcarriers, (iv) transmitting symbols in a first slot on the identified subcarrier, with a non-zero power level less than the nominal power level associated with the determined subcarrier, and (v) transmitting subsequent symbols on the determined subcarrier, wherein the respective power level of each of the subsequent symbols is successively increased for each subsequent timeslot, for at least the duration of the initial frame.

27. The method of claim 26, wherein the identified subcarrier is within a number of subcarriers from an edge of a channel.

28. The method of claim 26, wherein identifying the subcarrier on which to transmit with the reduced power level is based on the identified subcarrier being likely to cause interference.

* * * * *